United States Patent [19]
Boivin

[11] Patent Number: 5,421,689
[45] Date of Patent: Jun. 6, 1995

[54] REFUSE COMPACTION VEHICLE

[76] Inventor: Claude Boivin, 7255 Du Mousquet, Québec G2K 1Z7, Canada

[21] Appl. No.: 343,822

[22] Filed: Nov. 3, 1994

Related U.S. Application Data

[63] Continuation of Ser. No. 44,754, Apr. 12, 1993, abandoned.

[51] Int. Cl.⁶ .............................................. B65G 67/04
[52] U.S. Cl. ...................................... 414/409; 414/517
[58] Field of Search ................................ 414/406–409, 414/509–517

[56] References Cited

U.S. PATENT DOCUMENTS

| | | | |
|---|---|---|---|
| 3,148,793 | 9/1964 | Walter | 414/409 |
| 3,757,969 | 9/1973 | Smith | 414/517 |
| 4,220,280 | 9/1980 | Trott et al. | 414/511 X |
| 4,221,527 | 9/1980 | Morrison | 414/517 |
| 4,632,628 | 12/1986 | Kress et al. | 414/517 X |
| 4,840,531 | 6/1989 | Dinneen | 414/409 |
| 4,877,366 | 10/1989 | DeFilippi | 414/517 |
| 4,981,411 | 1/1991 | Ramsey | 414/409 X |
| 5,067,868 | 11/1991 | Boda | 414/517 X |
| 5,122,025 | 6/1992 | Glomski | 414/517 X |
| 5,123,801 | 6/1992 | O'Daniel | 414/517 X |

FOREIGN PATENT DOCUMENTS

| | | | |
|---|---|---|---|
| 2191461 | 12/1987 | United Kingdom | 414/409 |
| 2208285 | 3/1989 | United Kingdom | 414/510 |

OTHER PUBLICATIONS

Trade brochure, Labrie Equipment Company, Hydraulic Overtop Loading Recycler, dated Apr. 1991.
Trade brochure, Wittke Iron Works, Wittke Top Loading Recycler, dated Apr. 1991.

*Primary Examiner*—David A. Bucci

[57] ABSTRACT

A refuse collection compaction vehicle houses in a constant section container a moveable partition wall capable of compressing materials lengthwise in either direction. A hydraulic cylinder is attached to the floor and covered by a protective sheath attached to the partition wall and moveable with the wall. The wall comprises a frame installed on sliding skates. The frame houses a door which is hinged on top and may be tipped to let pass the compacted products of the fore compartment.

3 Claims, 8 Drawing Sheets

REFUSE COMPACTION VEHICLE

This application is a continuation of application Ser. No. 08/044,754, filed Apr. 12, 1993, now abandoned.

FIELD OF THE INVENTION

This invention is related to a refuse collection container vehicle having two reception chambers and a mobile over the top feed mechanism for the collection of waste materials.

BACKGROUND OF THE INVENTION

A need has been developed for a waste collection vehicle which readily differentiates fibrous combustible materials from non fibrous materials. Many such vehicles have been developed and one of them is described in U.S. Pat. No. 5,122,025 June 1992 by Glomski, a patent which describes a mobile interior wall which opens and closes storage space in a truck. Glomski utilizes small buckets and repeated compaction in the loading zone, which is not practical for loading. The art also discloses a German patent DE 3,231,002 10 Mar. 1983 by Fahrzengbau, which discloses a compressible volume defined by the location of a deflector of a hopper; the location of the hopper cannot be modified by the operator nor can be modified the area of loading. This method although effective in use is very complicated in its mechanical structure.

SUMMARY OF THE INVENTION

An object of the present invention is to provide an improved Refuse compaction vehicle.

In accordance with one aspect of the present invention there is provided a side charging and over the top loading vehicle which comprises a moveable wall which compresses fibrous materials on the forward stroke and compresses the non fibrous materials on the back stroke. The loading follows the moveable wall on either side by manual displacement of a limit marker.

Another object of this invention is to utilize the near totality of the volume of the container to store fibrous and non fibrous materials and a further object is to allow the loading of two different materials and to allow the relative compaction of both.

Another objective is to optimize the spreading of the charge in the bin because side loading implies a large proportion of the charge falling always at the same spot near the loading side.

A further objective is to allow a variable volume in each of the compartments, resulting from compaction on each side of the partition and up to the top and to provide ease of unloading.

A general objective is to provide a dual compartment compaction vehicle comprising a container of generally cubical shape with a fore end, an aft end, a roof, a floor, two sides, a length and a generally rectangular, constant dimension, cross section extending from the fore end to the aft end; a moveable partition frame having upper and lower beams and two columns of generally same dimensions as the cross section, said moveable frame being installed perpendicularly of the length; a compaction door of generally same dimensions as the partition frame, the compaction door comprising a top and a bottom, means attached to the upper beam for pivotally retaining the door top when the door bottom is released; hydraulic means releasably attached to the frame for perpendicularly displacing the frame towards the aft end and from aft end towards fore end and comprising a pair of rails installed on both sides of said floor and disposed lengthwise and a pair of means for sliding in cooperation with the rails such as C-shaped channels and oriented towards center line of the length and in a different embodiment towards the sides of the container.

Another general objective is to provide a dual compartment refuse compaction street vehicle comprising:

a container of the general shape of a parallelepiped having a fore end, an aft end, a length and a generally rectangular, constant dimension, cross section extending from the fore end to the aft end, two lateral walls: a street lateral wall and a sidewalk lateral wall, a floor, a roof provided with a longitudinal opening at sidewalk side, the opening extending generally from fore end to aft end, the roof opening adapted for loading of the container and the aft end pivotally attached to the vehicle, for unloading by lifting fore end of the container, a power-assisted moveable rectangular partition frame comprising one upper and one lower beams and two lateral beams fixed together by their respective ends, the frame outline of generally same dimensions as dimensions of the cross section, the moveable frame being installed perpendicularly of the length, the frame further comprising means attached to the floor for perpendicularly displacing the frame towards the aft end and from the aft end towards the fore end, a rigid compaction door of generally same dimensions as the partition frame and attached within the moveable partition frame, the compaction door when in cooperation with the frame separating the container in two variable size compartments in the interior space of the container: a fore compartment and an aft compartment, the compaction door comprising a bottom releasably locked to the lower beam and a top pivotally attached to the upper beam for retaining the door when the bottom of the door is released from the lower beam, when unloading refuse from the fore compartment towards the aft end, and further comprising means for locking the door onto the frame, a generally rectangular charging bucket for taking refuse from floor level to roof level, the bucket installed on the external side of the sidewalk lateral wall and extending generally over the full length of the container, the bucket comprising a moveable partition adapted to coincide, when the bucket is raised to a position facing the roof opening, with the position of the compaction door, thereby defining two variable loading areas on the fore and aft ends of the container.

BRIEF DESCRIPTION OF THE DRAWINGS

The present invention will be further understood from the following description with reference to the drawings in which.

DETAILED DESCRIPTION

Figure 1:
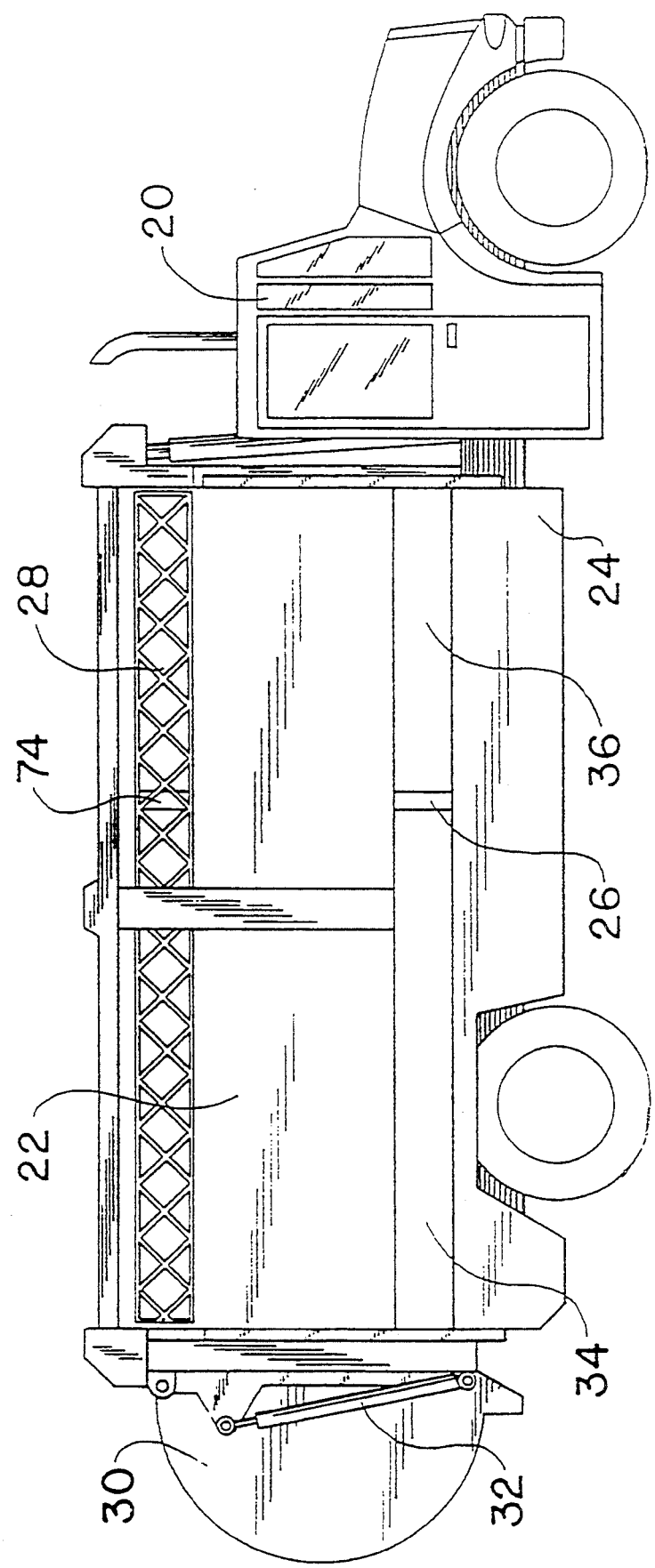
FIG. 1 is a view from the right side of a truck.

Referring to FIG. 1, there is illustrated a vehicle 20 carrying a container 22 on which is mounted a refuse collection structure 24, which consists in a lateral bucket 24 provided. The match line 12 change provided with a partition 26 to divide two sets of loading materials. A screen 28 allows for the observation of the level of materials inside container 22. The container comprises an exit or aft end 44 with an exit door 30 opened by means of a cylinder 32. The exit door 30 is preferably of hemispheroidal shape to allow for increased compaction. The lateral charging bucket 24 includes a manually placed partition 26 which limits the spread of two classes of refuse, i.e. one class of generally combustible and paper base materials towards the back 34 and another class of plastic, metal and glass towards the front 36. The container is charged from the top 41 on the side 40 ... FIG. 2. The container is provided with a fore end 46 and aft end 44, a right side 40, a left side 42 and a floor 43.

Figure 2B:
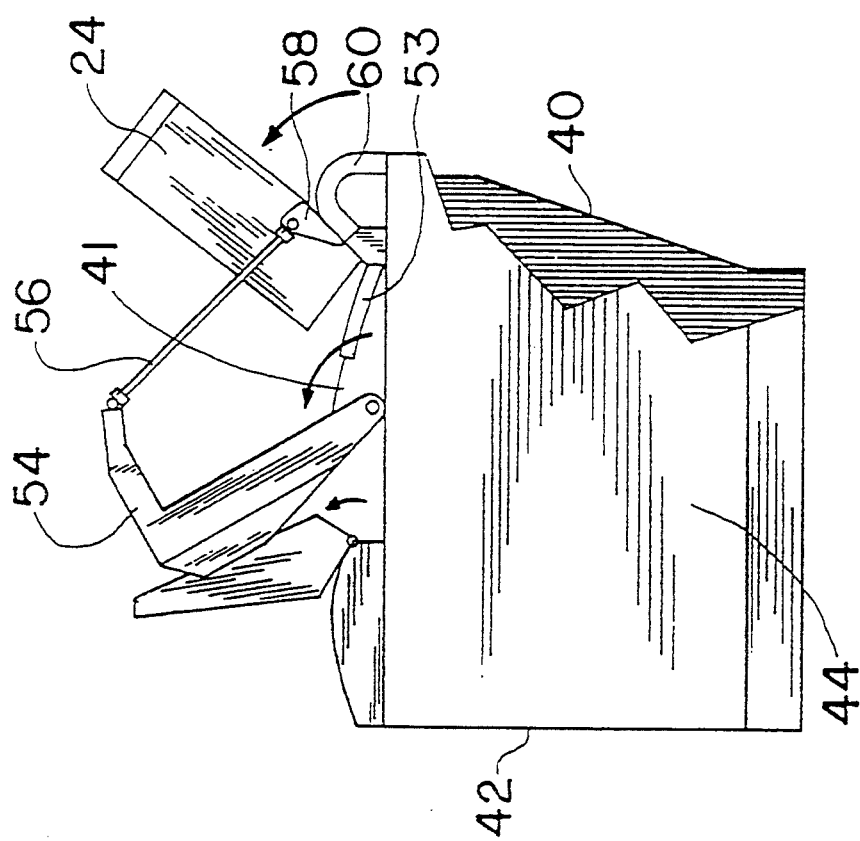
FIG. 2b is a cut view from the back illustrating dumping into a truck container, with bucket up.
Figure 2A:
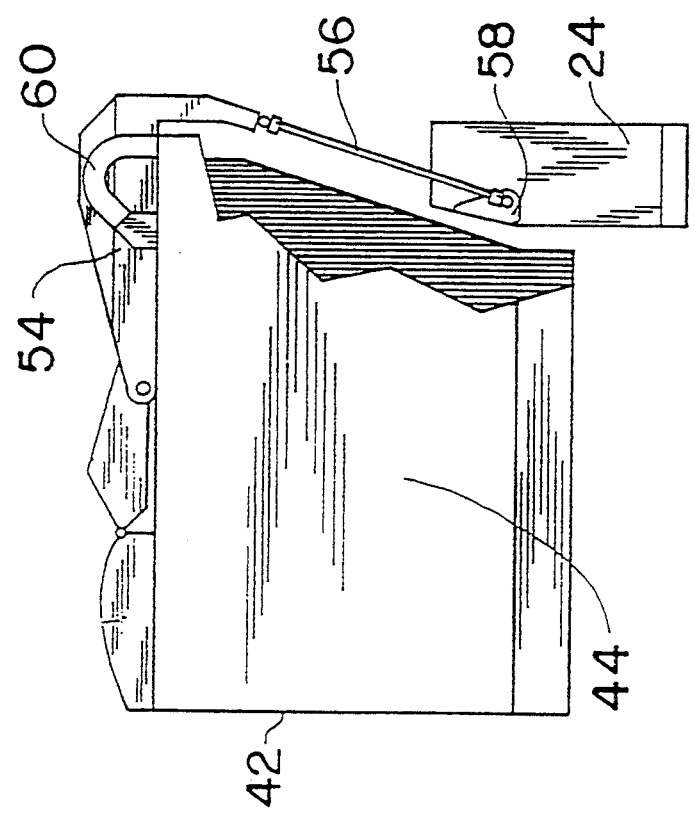
FIG. 2a is a cut view from the back illustrating dumping into a truck container, with bucket down.

FIGS. 2a–2b illustrate views from the back of the container and illustrate the principle of charging refuse into the interior of the container. Refuse are loaded into the lateral bucket 24 which is found on the right side of the vehicle. When the bucket is full, the operator commands the extension of the hydraulic cylinder which pivots the roof cover 54 towards the left side 42. The roof cover, by means of a lever 56 fixed at its inferior end drives upwardly a guide 58 which is fixed on the lateral bucket 24 by means of a pivot. The movement of the guide is channeled by rail 60. When the guide reaches the end of the course, the lateral bucket 24 finds itself in a position and at an angle such that the refuse are dumped longitudinally in the middle of the container 22 ... FIG. 1 ... causing thus a better distribution lengthwise in the interior of the container.

Figure 3:
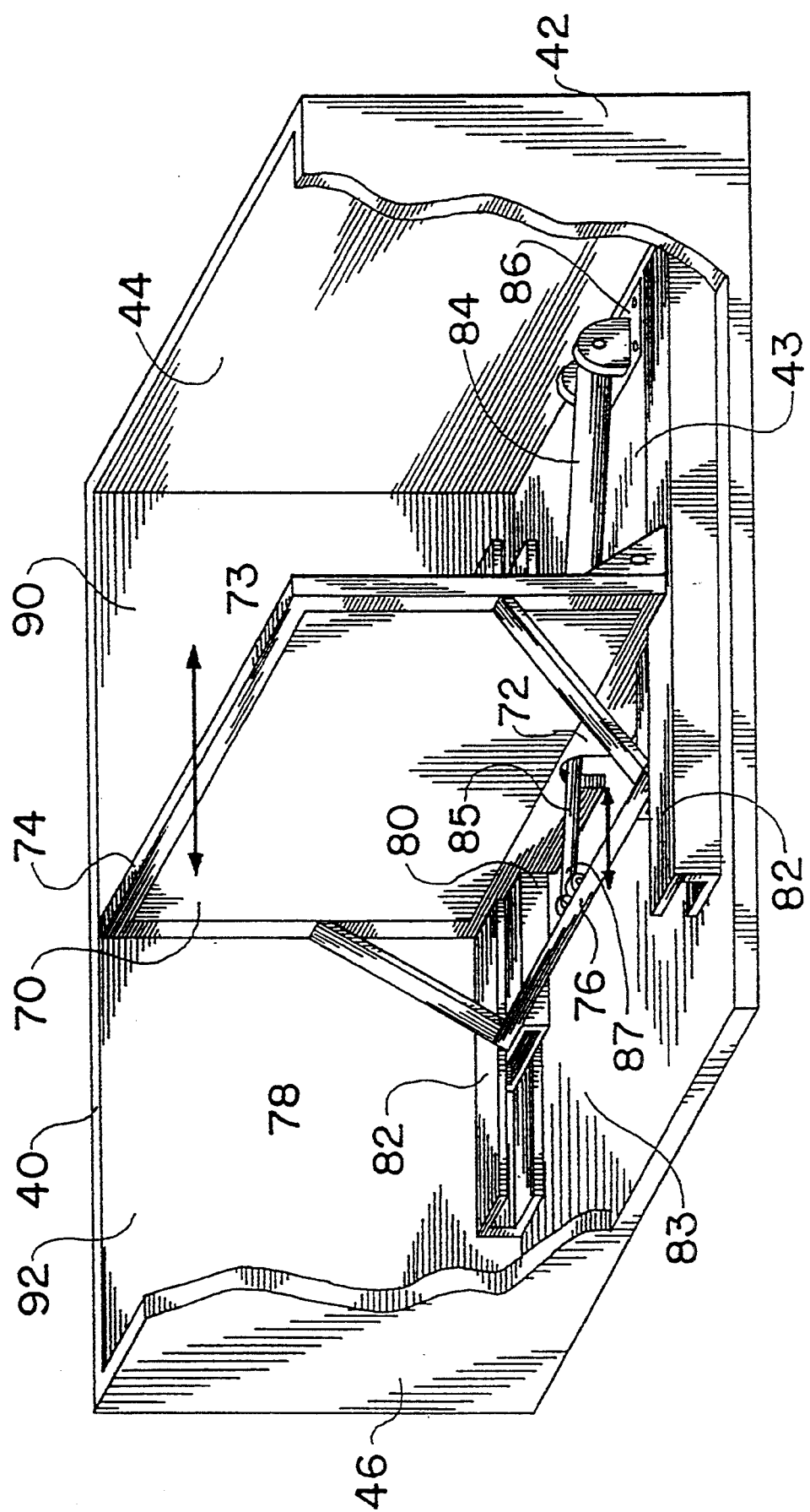
FIG. 3 is a perspective showing the inside of the container.

FIG. 3 illustrates in an open view of the interior of the container a reversing mobile structure compacting refuse. The compacting structure separates the container in two compartments, namely the back compartment 90 and the forward compartment 92, the two compartments serving to separate the two distinct classes of refuse. The compacting structure is made to be displaced longitudinally forward and backward by means of the extension and retraction of a hydraulic 84 cylinder attached at the fixed end 86 to the floor of the forward compartment 92 and at the moveable end 87 to the transverse beam 76 of the mobile structure. The extension and the retraction of the cylinder acts on the transverse beam 76 which entrains the whole of the mobile structure including supporting and sliding skates 80 which are guiding longitudinally the structure. The skates 80 serve as a base to the moving structure and slide within the confines of a pair of rails 82 fixed to the floor of the container by means of welding 83.

The piston 85 in preferred embodiment has a displacement of five feet; the fixed end 86 of the hydraulic cylinder 84 may be attached on further displacement means such as a second five foot piston which would start acting at the end of the displacement of the first piston, or other means such as a rack and pinion which would allow increased displacement to 15 feet in a 25 foot bin container. Cylinder 84 may also be attached on different anchor points manually to provide different volume configurations.

Figure 4:
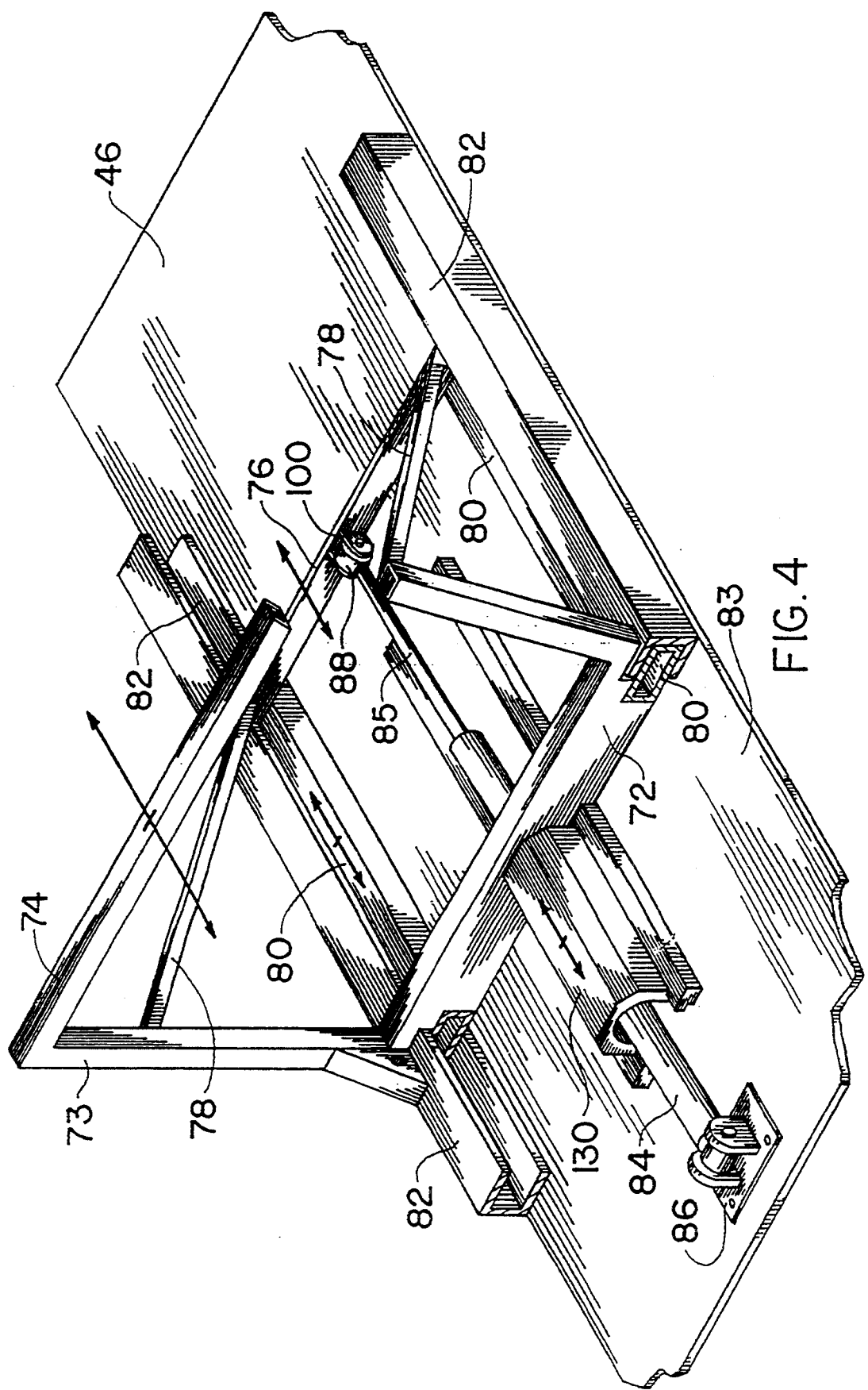
FIG. 4 is a perspective as per FIG. 3 showing structural elements.
Figure 5:
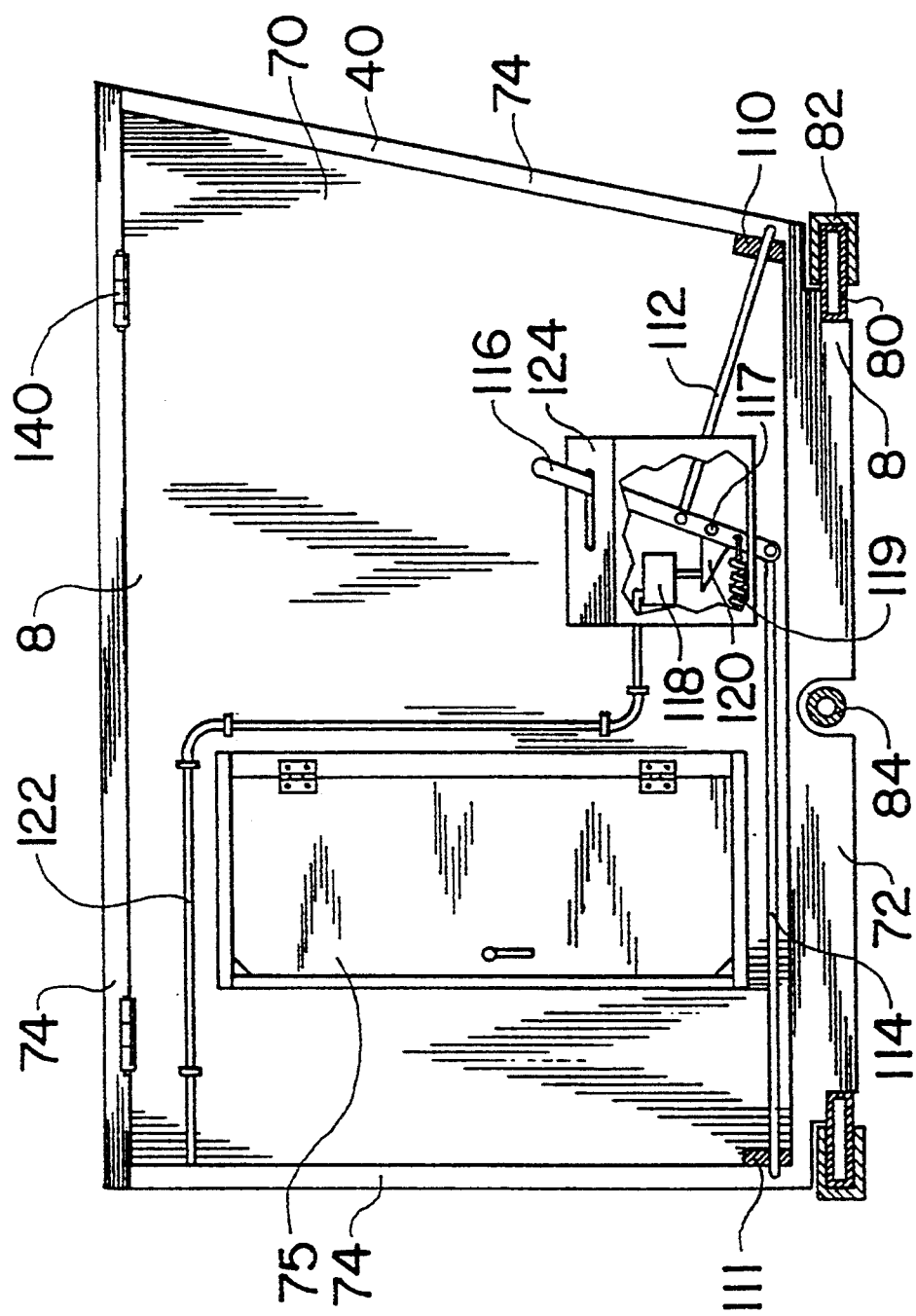
FIG. 5 is a face view of the compression wall seen from the back of the container.
Figure 6A:
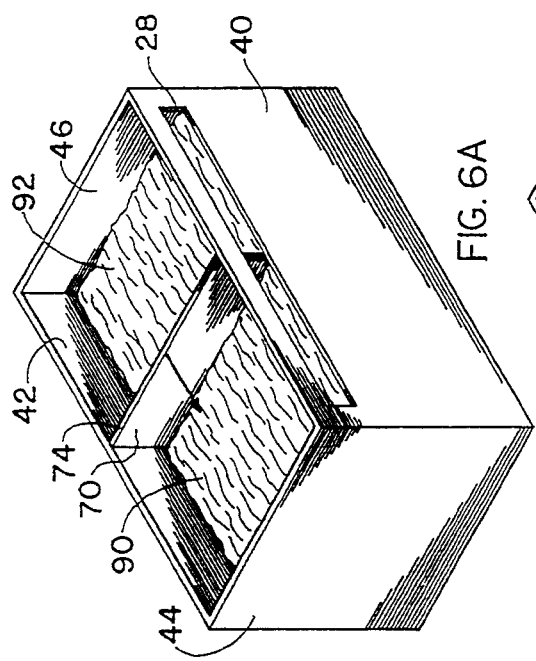
FIGS. 6a–6d are schematic illustrations of a compaction sequence.
Figure 6B:
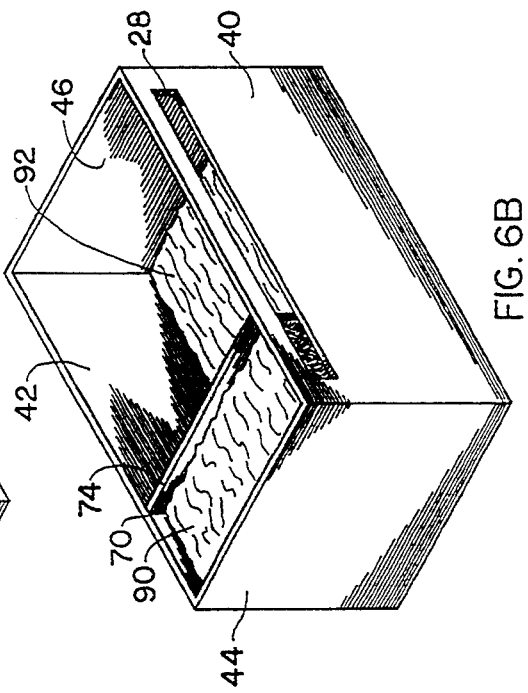
Figure 6C:
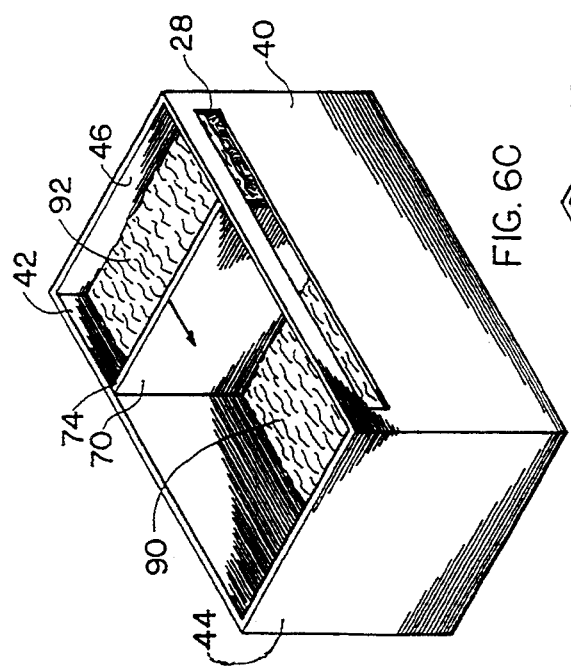
Figure 6D:
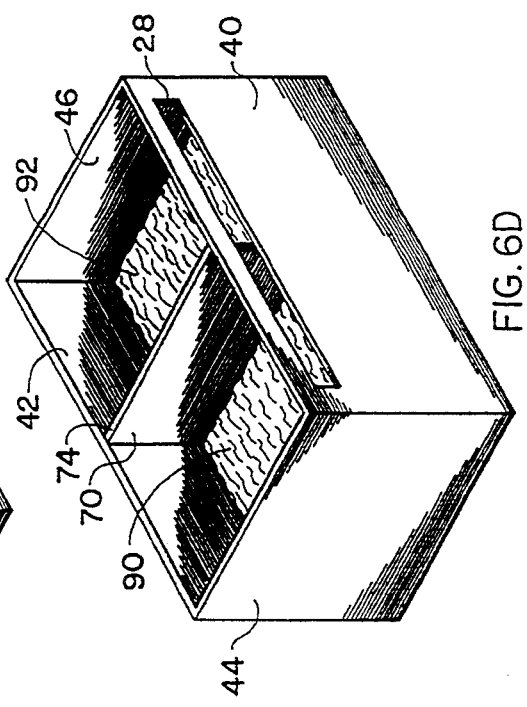

FIG. 4 offers a detailed view of the compacting structure. The moveable end of a hydraulic cylinder 84 is attached to the transverse bar beam 76 by means of a pivot 100. Two reinforcing bars 78 welded to the transverse beam 76 relate the latter to the frame 74 of a mobile wall. The inferior part 72 of the frame rests on the two lateral skates 80 which slide on the rails 82. The rails 82 on the sides guide the lower end 72 over a course of five feet or more. The central rail 132 guides a sheath 130 which protects the cylinder 84 against undesirable refuse. The sheath 130 acts as a protection cover fixed to the partition frame of displaceable wall 73 at the inferior part 72 of the structure, the sheath 130 following the displacement of the piston rod 85. The wall structurally consists in a frame 74 ... FIG. 5 ... in which there is a door 70 which covers the interior of frame 74 and which is sufficiently rigid to account for the effect of compaction. The door 70, locked on frame 74 by means of bars 112 and 114, may be released from anchor points 110,111 by means of a mechanism manually operated by means of lever 116 or activated from the cab by means of a pneumatic actuator 118 which moves support 120 downwards causing lever 116 to move to the left pivotally around pivot 117. A spring 119 is biased towards locking bars 112 and 114 in the anchor points 110 and 111. The door is released from the bottom to pivot on the top at hinges 140 and let pass the charge located in the forward compartment 92 ... FIG. 3 ... to compartment 90. The charge spreads six (6) feet high but hardly more than five (5) feet across the width of the container, so it is important that a displaceable wall 73 be extended up to the top, serving as deflector to stop materials from changing compartment.

Figure 7B:
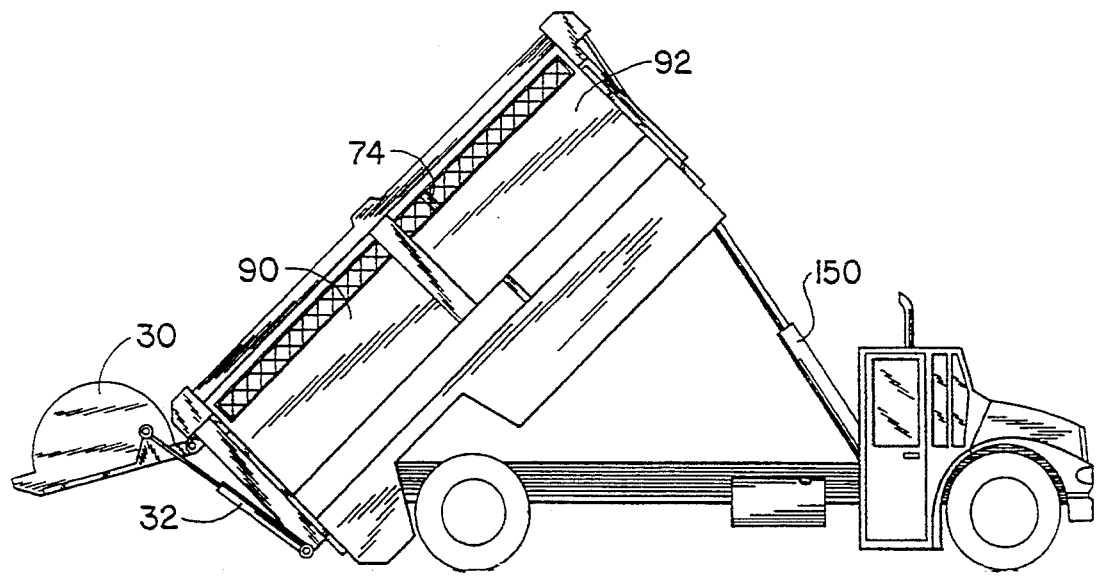
FIG. 7b is a view of FIG. 7a with container dumping.
Figure 7A:
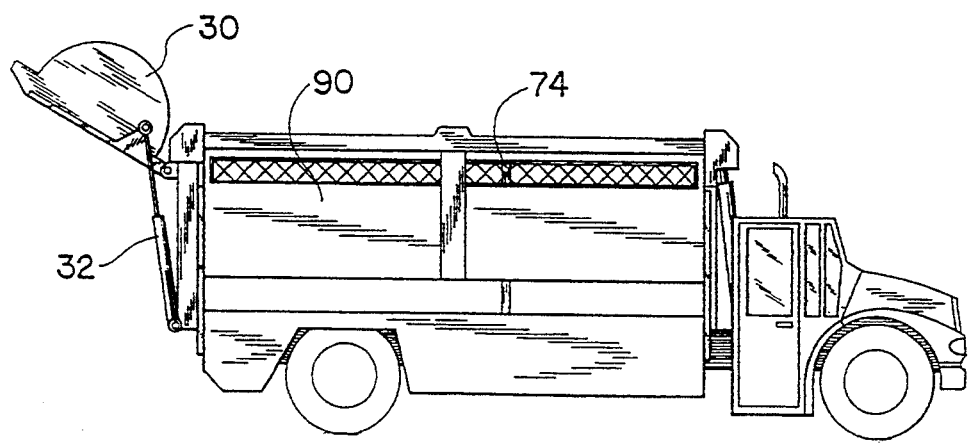
FIG. 7a is view of FIG. 1 with rear door open.

FIG. 6 illustrates the relative effect of compacting of two types of refuse materials in the two compartments of the container. The moving of the mobile wall towards the back face 44 or towards the front end wall 46 causes the compacting of the materials, and the operator with the help of screen 28 may supervise the extent of the motion of the moveable partition or the level of materials accumulated in the respective compartments. When the container is deemed sufficiently full the operator may proceed with the evacuation of each section of the container in their respective sites. As a first step, as appears in FIG. 7A the operator commands the extension of hydraulic cylinder 32 which as a result causes the raising of the back door 30 level with the roof of the container. Once the back door is open the container may pivot ... FIG. 7B ... towards the back end by means of the hydraulic cylinder 150. To facilitate the unloading the operator may displace backwardly mobile wall 74 of which the superior part may easily be seen through screen 28 as it moves towards the back end and thus displaces the refuse materials in compartment 90 towards the exit end.

Figure 8:
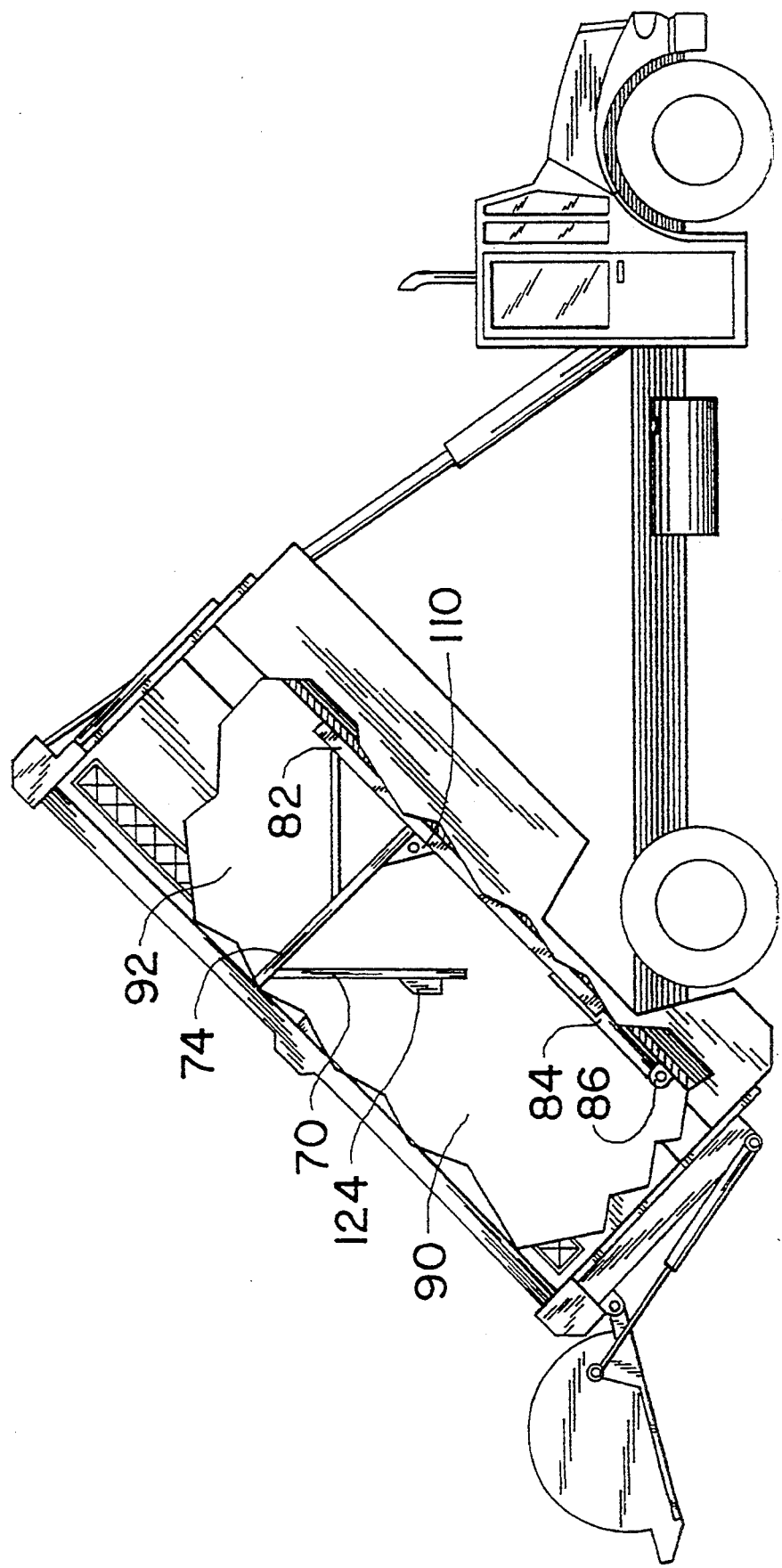
FIG. 8 is the view of FIG. 7b in a different sequence, without screen.

Once the rear compartment 90 is empty one may proceed with the discharging of the materials in the front compartment 92 into a different unloading site. As illustrated in FIG. 8 the disengagement of the anchor locking system 124 ... FIG. 5 ... of door 70 from mobile wall structural frame 74, door 70 being thus liberated at its lower end from its surrounding frame 74 the door will then easily pivot on hinges installed on the roof beam part of the wall structure when the container is in a position tilted towards the rear end. The refuse materials which are no longer under the effect of the compacting because of the displacement of the mobile wall towards the rear end 90 jump through the opening of door frame 74 and towards the exit end. The door 70 may be released by means of a mechanism manually operated or activated from the cab, from the bottom to pivot on the top and let pass the charge located in the forward compartment 92 of the container. A service door 75 permits access from the back compartment 90 to the front compartment 92.

A preferred embodiment and a minor variation of the subject invention is described herein. However, it will be understood that other embodiments and variations of the one described are possible within the scope of the invention which is limited only by the scope of the appended claims:

I claim:

1. A dual compartment refuse compaction street vehicle comprising:
   a container of a general shape of a parallelepiped having a fore end, an aft end, a length and a generally rectangular, constant dimension, cross section extending from the fore end to the aft end, two lateral walls: a street lateral wall and a sidewalk lateral wall, a floor, a roof provided with a longitudinal opening at sidewalk side, said opening extending generally from fore end to aft end, said roof opening adapted for loading of said container and said aft end pivotally attached to said vehicle, for unloading by lifting said fore end of said container, said top opening adapted for loading from both sides,
   a power-assisted moveable rectangular partition frame comprising one upper and one lower beams and two lateral beams fixed together by their respective ends, said frame outline of generally same dimensions as dimensions of said cross section, said moveable frame being installed perpendicularly of said length, said frame further comprising means attached to said floor for perpendicularly displacing said frame towards said aft end and from said aft end towards said fore end,
   a generally rectangular charging bucket for taking refuse from floor level to roof level, said bucket installed on an external side of said sidewalk lateral wall and extending generally over the full length of said container, said bucket comprising a moveable partition adapted to coincide, when said bucket is raised to a position facing said roof opening, with a position of a rigid compaction door, thereby defining two variable loading areas on the fore and aft ends of said container, and
   said rigid compaction door of generally same dimensions as said partition frame and attached within said moveable partition frame, said compaction door when in cooperation with said frame separating said container in two variable size compartments in an interior space of said container: a fore compartment and an aft compartment, said compaction door comprising a bottom releasably locked to said lower beam and a top pivotally attached to said upper beam for retaining said door when the bottom of the door is released from said lower beam, when unloading refuse from said fore compartment towards said aft end, and further comprising a means for locking said door onto said frame, said locking means comprising two bars adapted for locking, said two bars having meeting ends and far ends, said bars aligned horizontally end to end and slidingly mounted on said compaction door at said floor level and separated by a fulcrum pivot, said far ends adapted to embed, when in locking position, into said frame side beams, said locking means further comprising a lever linked to said two bars at said meeting ends and mounted on said pivot, the action of said lever on said pivot and on said meeting ends causing a displacement of the bars away from each other into locking position, and towards each other out of locking position, and further including biasing means spreading apart said two bars towards said locking position.

2. A compaction vehicle as defined in claim 1 wherein said biasing means comprise a linear spring disposed on one side of said lever, said spring having two ends of which one end is fixed to said door and the other end is attached to said lever between said fulcrum and the meeting end of a corresponding bar, said lever being extended beyond said two bars for manual displacement.

3. A compaction vehicle as defined in claim 1 further comprising a power piston localized between said fulcrum and said spring and adapted to act against the bias of said spring for mechanical displacement of said lever and unlocking said door.

* * * * *